US011947346B2

United States Patent
Uriarte et al.

(10) Patent No.: US 11,947,346 B2
(45) Date of Patent: Apr. 2, 2024

(54) APPARATUS AND METHOD FOR IMPROVING THE COMMUNICATION OF MODULAR CONVEYOR SYSTEMS

(71) Applicant: CELLUMATION GMBH, Bremen (DE)

(72) Inventors: Claudio Uriarte, Bremen (DE); Ivan Kuznetsov, Bremen (DE); Miguel Bande Firvida, Bremen (DE)

(73) Assignee: CELLUMATION GMBH, Bremen (DE)

( * ) Notice: Subject to any disclaimer, the term of this patent is extended or adjusted under 35 U.S.C. 154(b) by 0 days.

(21) Appl. No.: 17/600,495

(22) PCT Filed: Apr. 2, 2020

(86) PCT No.: PCT/EP2020/059381
§ 371 (c)(1),
(2) Date: Sep. 30, 2021

(87) PCT Pub. No.: WO2020/201413
PCT Pub. Date: Oct. 8, 2020

(65) Prior Publication Data
US 2022/0171369 A1    Jun. 2, 2022

(30) Foreign Application Priority Data

Apr. 2, 2019 (DE) .......................... 102019204709.2

(51) Int. Cl.
G05B 19/418    (2006.01)
H04L 12/40    (2006.01)

(52) U.S. Cl.
CPC ..... *G05B 19/4189* (2013.01); *G05B 19/4185* (2013.01); *H04L 12/40* (2013.01);
(Continued)

(58) Field of Classification Search
None
See application file for complete search history.

(56) References Cited

U.S. PATENT DOCUMENTS 7,035,714 B2    4/2006   Anderson et al.
2012/0004766 A1   1/2012   Stoll et al.

FOREIGN PATENT DOCUMENTS

DE   212006000033   12/2007
DE   202012001229   4/2012
(Continued)

OTHER PUBLICATIONS

Overmeyer, Ludger, et al. "Interfaced multidirectional small-scaled modules for intralogistics operations." Logistics research 2 (2010): 123-133. (Year: 2010).*

(Continued)

*Primary Examiner* — Carlos R Ortiz Rodriguez
(74) *Attorney, Agent, or Firm* — Sheridan Ross P.C.

(57) ABSTRACT

The invention relates to a modular conveyor system, comprising multiple individual conveyor modules, wherein an individual conveyor module comprises at least one conveyor device, at least one power supply, at least one actuator for driving the conveyor device, an output unit for the control of the actuator and an integrated control unit, wherein the integrated control unit has a computing unit for processing information and a communications unit, and wherein the communications unit is designed to carry out the communication of the individual conveyor modules with a central control system, on the one hand, and/or the communication of the individual conveyor modules with one another, on the other hand, in such a way that the communication of the individual conveyor modules with one another is imple- (Continued)

mented at two logical communication levels. The invention further relates to a method for controlling modular conveyor systems.

17 Claims, 7 Drawing Sheets

(52) U.S. Cl.
CPC .............. *G05B 2219/31145* (2013.01); *G05B 2219/40304* (2013.01); *G05B 2219/45054* (2013.01)

(56) References Cited

FOREIGN PATENT DOCUMENTS

| | | |
|---|---|---|
| DE | 102017215508 | 3/2019 |
| EP | 2455310 | 5/2012 |
| EP | 3418834 | 12/2018 |
| FR | 2991976 | 12/2013 |
| WO | WO 2008/135371 | 11/2008 |

OTHER PUBLICATIONS

International Search Report and Written Opinion for International (PCT) Patent Application No. PCT/EP2020/059381, dated Jun. 12, 2020, 12 pages.
English Translation of the International Search Report for International (PCT) Patent Application No. PT/EP2020/059381, dated Jun. 12, 2020, 2 pages.

\* cited by examiner

Fig 7 ved in EP 2 455 310 A1.
APPARATUS AND METHOD FOR IMPROVING THE COMMUNICATION OF MODULAR CONVEYOR SYSTEMS

CROSS REFERENCE TO RELATED APPLICATIONS

This application is a national stage application under 35 U.S.C. 371 and claims the benefit of PCT Application No. PCT/EP2020/059381 having an international filing date of 2 Apr. 2020, which designated the United States, which PCT application claimed the benefit of German Patent Application No. 10 2019 204 709.2 filed 2 Apr. 2019, the disclosures of each of which are incorporated herein by reference in their entireties.

The invention relates to an apparatus and a method for improving the communication of modular conveyor systems.

BACKGROUND

In modern plant engineering as well as in conveyor systems, logistic objects such as boxes, containers, trays, pallets, etc., as well as workpieces or workpiece carriers are transported by means of material flow systems. These systems consist of a mechanical structure, electrical wiring, and a control system.

Modern material flow systems are usually structured in a mechanically modular manner. Conveyor modules include conveyors, diverters, curves, crossings, merging devices or mergers, transfer tables, etc. Each of the modules is available in numerous configurations depending on length, roller pitch, width, capacity, etc. A conveyor system is composed of a plurality of different conveyor modules that are connected together.

In traditional conveyor modules, the object to be transported is smaller than the conveyor module itself. Often, one or more objects can be placed on a conveyor module at the same time. The conveyor module alone is capable of conveying the objects over longer distances. Conveyor modules that are larger than the material to be conveyed are referred to as large-scale. On the other hand, conveyor modules that are smaller than the material to be conveyed are referred to as small-scale. In this case, a plurality of conveyor modules is required to convey material to be conveyed at any given time. These conveyor modules can be uni-, bi- or omnidirectional depending on the design of the drives. Small-scale conveyor modules represent a relatively recent development. They will generally be arranged in a triangular, square, or hexagonal grid. However, irregular grids are also possible.

The control of material flow systems is usually implemented as a central control system and is distributed over several levels. The superordinate level (e.g. a Warehouse Management System—WMS), where the logic for the correct sequence of the material flow is stored, forwards commands for execution in a high-level language to the subordinate control system. This second level consists of one or more programmable logic controllers (PLCs) distributed throughout the plant and is responsible for controlling the conveyor modules. This level can process data from sensors or external systems and actuate drives and actuators. In this case, drives, actuators, and sensors are directly connected to the PLC. Modern conveyor modules also have a third control level, the so-called "local control". These local controls are built into the conveyor modules in close proximity to the drives/sensors. They can process a small number of sensor signals and control a small number of drives. They can independently perform relatively simple tasks limited to the local level, such as a so-called zero pressure accumulation in which objects are moved one after the other in start/stop operation without touching each other. An example of such a control system for a zero pressure accumulation conveyor is described in EP 2 455 310 A1.

The power supply of material flow systems is either completely centralized or partially decentralized. In the case of centralized power supply, all conveyor modules are supplied directly from the control cabinet.

The process of planning a material handling system until its use starts with layout planning. Here, the functionalities of the system and performance parameters to be achieved are defined, specifications are prepared, and often the project is put out to tender. System integrators work out a technological concept, layout planning and selection of conveyor modules for implementation and submit their bids. The process usually takes several weeks and involves large personnel costs and uncertainty about the outcome of the tender for the applicant. Once the bid has been accepted, detailed planning begins, the layout is specified, and the conveyor modules are designed and dimensioned. The production of the individual modules can only take place after the planning has been completed and accepted by the customer since changes in the process or layout from this point onwards are very time-consuming to implement and are associated with high costs. The production is mostly implemented in a customer- and order-specific manner and can take several months. Due to the customer-specific adaptations, conveyor modules can rarely be produced in stock. A complete commissioning at the manufacturers site will usually not take place for practical reasons. After the mechanical assembly on site, the cables for the control system are laid. They can be installed in the conveyor modules. Drives and sensors systems can be wired directly to the superordinate controller (PLC). Local controls, which are used to control motorized rollers, for example, can either be wired directly to the superordinate controller (PLC) or connected via a BUS system. The power supply is provided in a similar way. The voltage is fed to the respective drives via parallel lines. This results in very large cable harnesses, which lead to high material costs and high installation costs.

Subsequently, the commissioning takes place. The topology of the plant is entered manually, conveyor modules and drives are addressed and the first wiring tests are carried out. This process is called configuration. Wiring and addressing errors can only be detected at this point. Troubleshooting and changes are even more time-consuming at this point, since commissioning usually takes place at a later point in time and is implemented by a different team than the team that was responsible for assembly. The layout of the plant is therefore determined twice; the first time during the mechanical assembly and a second time during the configuration of the plant.

During the service life of the plant, it is also common that changes in function, programming or layout are implemented. Since the modules are modular only on the mechanical level and the programming and wiring was still done centrally, a change of the plant is very costly and, in some cases, no longer possible. It is often cheaper to purchase a new plant than to modify an older plant.

The problem is well known and there are some conveyor systems that try to simplify these processes or to eliminate the disadvantages.

Known from FR2991976 is a conveyor system with a modular mechanical structure with decentralized control which is installed in each conveyor module of the conveyor system. Conventional modules are used as the conveyor module, such as roller conveyors, transfer tables, belt transfers, etc. The conveyor modules are wired at the factory. The integrated controller (the so-called card) consists of a processor (computing unit), a first communication interface (I/O or field bus) for signal exchange with the drives of conveyor system or the controller thereof, and a second communication unit for data exchange between neighboring conveyor modules or their controllers. The communication unit has up to four connections (downstream, upstream, left and right) and communicates with its neighbor via a standard protocol, specifically Ethernet. Furthermore, the publication discloses a method for automatic recognition of plant topologies after the plant has been mechanically built. The host computer (PLC) asks a first card for the topology of the plant. This card sends a message with its ID downstream and upstream. The receiving card adds its ID to the message and forwards the message. When a branch is reached, the ID of the branch is added to the message, the message is copied and sent to each output. The branching of messages is implemented using a switch. When a merging point is reached, the ID of the module is added to the message and the message is forwarded downstream. This forwarding is repeated until the message reaches the end of the chain. The message then contains a list of the ID of all modules that have passed. The message is sent back over the route already taken and finally transmitted to the master computer. The computer collects all messages and forms the plant topology from the lists.

Each card communicates with its neighbors via Ethernet. With each transmission, the messages must be processed by the computing unit. In the case of branches, these must be routed in the right direction via switches. Each transmission increases the latency of the communication. This increases further with the number of modules and branches in the layout. The delay is therefore not deterministic and the communication therefore does not take place in real time. Since this system uses only large-scale conveyor modules, the conveyor speed of the objects is much lower than the transmission speed of the messages. Thus, the delays are no longer critical. In a plant with a very large number of modules, or when the size of the conveyor modules is reduced or the number of branches is increased, the latency becomes critical. Therefore, this communication architecture is not applicable for very large plants or for small-scale conveyor systems.

DE102008059529 discloses a modular conveyor system with integrated controller. The system consists of a plurality of square transfer tables that can guide movements in 2 directions: longitudinal and transverse. Each of the conveyor modules has two drives with the appropriate motor controller and an integrated controller that has an architecture similar to the previous example. The integrated controllers communicate with each other via an Ethernet interface. The modules are assigned a module identification number at the factory. First, the neighboring modules exchange this identification number. Based on this, a conveyor module can create and store a routing table. The neighboring conveyor modules exchange messages with the other neighbors and create a routing table themselves. The table is sent upstream so that these conveyor modules can extend the routing table. If this process is repeated often enough, the overall topology of the system can be mapped and stored locally in each conveyor module. The controller itself consists of a microcontroller, i.e. a computing unit, for processing the signals, an Ethernet-based communication interface for data exchange between the conveyor modules, and an interface for controlling the separate motor controllers (vertical interface). By means of a suitable logic, the conveyor system is able to decentrally calculate the routing for the transport of the objects. This system has the same disadvantages regarding latency as the system of FR2991976.

Known from DE202012001229 is a small-scale conveyor system consisting of multiple rectangular conveyor modules, which are also arranged orthogonally to each other in a matrix. Each module contains two motors, one for driving the roller and one for adjusting the conveying direction. The controller is decentralized and built into each module. It consists of a computing unit for processing data, an interface for controlling the drives, and a communication interface for exchanging data between neighboring modules. Communication takes place with a serial protocol and wirelessly via photodiodes located on each of the four sides of the conveyor modules. The modules are not able to recognize the topology of the plant. At each jump, the data from the photoreceivers must be read, processed in the microcontroller, and sent with the light emitting diode. The data transmission therefore takes place with very high latencies which can only be partially compensated for by complex logic and mechanical setups. Thus, larger plants cannot be implemented.

Known from WO 2008/135371 A2 is a conveyor module and a conveyor system with integrated control system that is capable of determining its own topology. The conveyor modules can have arbitrary conveying functions, wherein the process of configuring the system by using identification means (e.g. barcode, RFID, transponder, etc.) includes the information about the conveyor element type (type, length, shape, etc.) and about the transfer points (coupling points). After completion of the mechanical assembly, the coupling points and a typing code are read out. The identification means can be read out manually or automatically. Preferably, the reading is implemented in pairs, thus, two identification means from neighboring conveyor modules. In the automatic process, the controllers communicate with each other and exchange this information. This information can be used to prepare graphs describing the (partial) topology of the system. It is also mentioned that the process can be started by software in an automation computer.

All modular conveyor systems known so far thus have a communication option for communication with a central control system and a communication option for communication between the conveyor modules.

Although the known conveyor systems also have further communication interfaces, these two or further communication levels are not used for communication between the individual conveyor modules, but in particular for data transfer to a motor controller which controls the drive of the conveyor device of the modules. This is also the case with the zero pressure accumulation conveyor plant of EP 2 455 310 A1 or the conveyor plant of U.S. Pat. No. 7,035,714 B2.

Due to the high latencies, the previously known conveyor systems with integrated control unit and partially decentralized control are therefore not suitable for larger systems with many individual conveyor modules. In addition, the variability of the present systems with regard to their setup and especially with regard to a subsequent change of the topology of the system are in need of improvement.

It is therefore an object of the invention to provide an apparatus and a method that enable variable control of both large conveyor systems with many individual conveyor modules and small conveyor systems with few individual conveyor modules in such a way that partial decentralized control is possible. Particular attention should be paid to the fact that the latency of the communication is kept low or avoided completely, if possible. In addition, improved variability in the event of changes is to be provided in order to be able to carry out the changes more quickly and also to reduce the planning and set-up time, in particular for large conveyor systems with many individual conveyor modules, and to simplify the process overall.

The object is achieved by a modular conveyor system, comprising multiple individual conveyor modules, wherein an individual conveyor module comprises
at least one conveyor device,
at least one power supply,
at least one actuator for driving the conveyor device,
an output unit for controlling the actuator, and
an integrated control unit,
wherein the integrated control unit has a computing unit for processing information and a communications unit, and wherein the communication unit is designed to carry out the communication of the individual conveyor modules with a central control system, on the one hand, and/or the communication of the individual conveyor modules with one another, on the other hand, in such a way that the communication of the individual conveyor modules with one another is implemented in two logical communication levels.

In the context of the present invention, the term modular conveyor system is understood to mean, in particular, a conveyor system that can transport, sort, and move a wide variety of logistical objects, such as, for example, packages, boxes, containers, trays, pallets, as well as workpieces or workpiece carriers. Such a modular conveyor system is composed of a plurality of individual conveyor modules.

In the meaning of the present invention, the term individual conveyor module, or conveyor module for short, is understood to mean, in particular, a conveyor device which is capable of spatially changing the objects to be transported. This includes both translational movement and rotation of the objects. Examples of such preferred individual conveyor modules include conveyors, diverters, curves, intersections, merging devices or mergers, transfer tables, etc. Each of the modules is available in numerous configurations depending on length, roller pitch, width, capacity, etc. Conveyor modules that are larger than the material to be conveyed are referred to as large scale. On the other hand, conveyor modules that are smaller than the material to be conveyed are referred to as small-scale. In this case, a plurality of conveyor modules is required to convey a material at any given time. These conveyor modules can be uni-, bi- or omni-directional depending on the design of the drives. Small-scale conveyor modules represent a relatively recent development. They will typically be arranged in a triangular, square, or hexagonal grid. Irregular grids are also possible.

In other words, the invention relates to a modular conveyor system consisting of a plurality of conveyor modules with integrated controls. The conveyor system can consist of only large scale, only small scale, or a mixture of large scale and small scale conveyor modules.

The conveyor device is understood to be the rollers, belts, etc. integrated in the individual conveyor module, which are provided for the movement or rotation of the objects. They can have various functionalities, in particular with regard to the possible direction of the movement, and are generally known to the person skilled in the art.

Power supply is to be understood hereinafter to include not only power supplies, converters, etc., but also cables, connectors and similar connections through which current can be supplied to the conveyor module.

The term actuator for driving the conveyor device is understood to mean in particular a motor, preferably an electric motor, which can set the conveyor device in motion. For example, an actuator is provided for each conveyor device of the individual conveyor module. However, it is also possible to provide only one actuator for a plurality of conveyor devices in an individual conveyor module.

In the meaning of the invention, the term output unit for controlling the actuator refers quite generally to a switch for switching the conveyor device on and off. Preferably, however, motor controllers (abbreviated MC) are used which not only enable the conveyor device to be switched on and off selectively but can also control, for example, speed and direction. The term output unit for controlling the actuator is thus synonymous with the term motor controller (MC).

According to the invention, each individual conveyor module has an integrated control unit. The integrated control unit comprises a computing unit for processing information and a communication unit. The communication unit is designed to carry out the communication of the individual conveyor modules with a central control system, on the one hand, and/or to carry out the communication of the individual modules with each other, on the other hand.

Furthermore, it is provided according to the invention to carry out the communication of the individual conveyor modules with each other in such a way that the individual conveyor modules communicate with each other on two logical communication levels. Therefore, this does not mean the communication to the motor controllers within the individual conveyor module or to the motor controllers of another individual conveyor module, but rather communication between the integrated control units of the respective individual conveyor modules.

This represents a decisive difference to the previously known conveyor systems and their control architecture because these known systems comprise a communication interface to the motor controller and a communication interface for communication between the individual conveyor modules, but no second communication level for communication between the individual conveyor modules.

The communication between the respective individual conveyor modules, i.e. in other words, the communication of the individual conveyor modules with each other via the integrated control units, is implemented according to the invention in two logical levels. The term logical (horizontal) communication level in its meaning in the context of the present invention is based on the ISO/OSI reference model for network protocols as a layered architecture. In the ISO/OSI model, the two logical levels may reside in parallel within a single layer. Examples of protocols that are based on the ISO/OSI reference model include CAN, Profinet, EtherCAT, Ethernet IP, etc.

According to the invention, the two logical communication levels are implemented by two separate and independent interface systems. Both communication interfaces can be operated in parallel. One level, for example the first level, is preferably also used for layout recognition and configuration of the system within the scope of the present invention, and another level, for example the second level, is preferably used for functional operation of the individual conveyor modules within the scope of the present invention.

Both communication levels (herein synonymous: communication systems) or the wiring thereof, preferably always run parallel and together with the mechanical setup of the individual conveyor modules to each other.

The topology of the material flow in a conveyor system according to the invention is thus identical to the topology of the communication network.

The arrangement according to the invention makes it possible to variably control both large conveyor systems with many individual conveyor modules and small conveyor systems with a few individual conveyor modules in such a way that partial decentralized control is possible. Due to the two parallel communication levels for the communication of the individual conveyor modules among each other, it is possible for the first time that latencies are completely avoided. In addition, improved variability in case of changes is provided in order to be able to carry out changes more quickly and also to reduce the planning and set-up time, in particular of large conveyor systems with many individual conveyor modules, and to simplify the process overall.

Advantageously, the individual conveyor module controllers can be wired in any way, even in such combinations that are incompatible for Real-Time communication interfaces (e.g., mesh or ring topology). According to the invention, these combinations can be recognized during configuration by means of the first communication layer (i.e., the first communication system). The second communication layer is subsequently configured (switched) such that these incompatible combinations are resolved.

Furthermore, the two communication levels can advantageously be used interchangeably after the configuration. Thus, in the conveyor system according to the invention, status messages can be transferred asynchronously, i.e., not only sequentially or purely time-controlled. This brings considerable variability and efficiency to the control functionality and therefore to the superordinate operation and modification possibilities of the conveyor system.

In a preferred configuration of the invention, the communication unit is designed such that a first communication level between the individual conveyor modules comprises a communication protocol that is not real-time-capable.

Particularly preferably, this first communication level is also used to configure the conveyor system. The configuration of the conveyor system or the controller of the conveyor system also includes the recognition of the layout of the conveyor system.

In a further preferred configuration of the conveyor system according to the invention, the communication unit is designed such that a second communication level is provided between the individual conveyor modules for controlling the respective at least one conveyor device, the second communication level being designed to be real-time capable.

A first individual conveyor module thus controls a second individual conveyor module, which is preferably arranged adjacent to the first individual conveyor module in the conveyor system, via the second communication level. In other words, it is a primary function of the second communication level to perform and ensure the adjustment of processes within a conveyor path. The communication of each conveyor section device with each individual conveyor module, with each of the other ones and/or at the same time with superordinated interfaces, e.g. with the central control system, takes place via the second communication level.

In this way, a real-time-capable line of communication can be established between the individual conveyor modules and/or with the central control system. Wiring each individual conveyor module to the central control system or possibly to any other individual conveyor module is eliminated. This not only simplifies the setup, but also enables defective individual conveyor modules to be quickly detected and replaced. In addition, the system according to the invention also enables expansion or addition of additional individual conveyor modules without the need to draw new cable connections through the entire plant.

In a further aspect of the present invention, it is also possible to no longer provide any central control of the conveyor system at all and to implement the control of the conveyor system in a decentralized manner via the integrated controls of the individual conveyor modules.

As a result, it is possible to further increase the flexibility and variability of the conveyor system according to the invention. Furthermore, in this way, conveyor systems can be planned and set up very quickly and in a resource-saving manner.

In a further configuration of the invention, both communication levels can be operated in parallel during operation of the system.

A serial interface, for example a UART interface, and/or an Ethernet interface and/or a mesh-capable interface is preferably provided as the interface for the first communication level.

A serial interface, for example a UART interface, is used to transmit and receive data via a data line and represents the standard of serial interfaces on PCs and microcontrollers. The interface is also very common in the industrial sector with various standards, such as RS-232 or EIA-485.

Radio protocols in particular are also available for a mesh-capable interface. Currently, Zigbee, Z-Wave and proprietary radio technologies are predominant, while others, such as Thread and Bluetooth Mesh, are new to the market. Although Bluetooth Low Energy and WiFi can also be used, they do not support meshed networks.

A BUS interface, and/or an Ethernet-based interface, and/or a line, star, and/or ring topology is preferably provided as interface for the second communication level.

Examples of BUS interfaces include, amongst others, CAN, and Profi-BUS. Examples of Ethernet-based interfaces include, amongst others, Profinet, EtherCAT, Ethernet IP, etc.

Other topologies can also be provided, depending on the requirements of the system layout. In another embodiment of the invention, the communication unit of an individual conveyor module comprises a plurality of connections, preferably with such a number of connections that corresponds to the number of neighboring individual conveyor modules with which the individual conveyor module communicates.

In the meaning of the present invention, the term neighboring individual conveyor module is to be understood, for example, as those other individual conveyor modules which are arranged adjacent to a first individual conveyor module and are capable of transferring logistical objects to the first individual conveyor module or receiving logistical objects from it.

Similarly, it is preferably also possible to provide an equal number of connections for each individual conveyor module regardless of the number of its neighbors, in particular a number that corresponds to the highest number of possible neighbors in the system. Accordingly, connections that are not needed are then not occupied or connected.

In this way, the greatest possible variability of the individual conveyor modules can be achieved and reconfigurations of the conveyor system are facilitated.

Connections in the meaning of the invention are understood to be not only cable connections but also plug connections, fiber optic connections or wireless connections that transmit data optically or electromagnetically.

Since an individual conveyor module can be communicatively connected to several neighboring modules, a meshed topology of communication is created so that a particular conveyor module can be supplied with data via several paths. If data transmission via one of the paths is interrupted due to a fault or malfunction, the remaining neighboring modules can still be supplied with data via other paths. As a result, the robustness of the overall system against faults can be further increased.

In a further configuration of the conveyor system according to the invention, further sensors or actuators can be connected to an individual conveyor module via the non-real-time-capable interface.

In the meaning of the present embodiment of the invention, further sensors or actuators are understood to mean, in particular, external sensors and actuators that are not part of the individual conveyor module but can only be connected to the individual conveyor module. Likewise, such sensors or actuators that are already factory-installed in the individual conveyor module are also comprised.

Furthermore, external sensors and actuators can be connected directly to the individual conveyor module via the non-real-time-capable interface. The signals from the sensors or actuators can be processed directly in the module and simple decisions can be made. Likewise, it is possible, for example, to route the signal from the sensor or actuator via one of the two communication levels to a central controller and/or to further individual conveyor modules for further processing.

Moreover, it is also possible to connect external sensors or actuators to the real-time-capable interface.

In a preferred configuration of the conveyor system according to the invention, the power supply is provided from an individual conveyor module to adjacent individual conveyor modules by means of cables.

In this way, the power supply can be looped through from one individual conveyor module to the next individual conveyor module. As a result, a considerable reduction in wiring can be achieved.

Since an individual conveyor module can be connected to multiple neighboring modules, a meshed topology of the power supply is created so that a particular individual conveyor module can be supplied with power via several paths. If the power supply via one of the paths is interrupted due to a fault or malfunction, the remaining neighboring modules can continue to be supplied with power via other paths. As a result, the robustness of the overall system against malfunctions can be increased.

The power supply to the modules is usually provided via one or more connections. The plant is supplied with 230V or 400V via a public or industrial network. The voltage is regulated down via power supply units, suitably to a voltage equal to or lower than 60V, in order to remain within the range of extra-low voltage according to the Machinery Directive. Preferably, 48V or 24V are used since this is common in drive technology. In consideration of the energy density, the electrical safety of the plant and the technical feasibility of the connections, 48V is preferred.

The input voltage can be positioned at any location in the plant of the conveyor system according to the invention. Due to the meshed network of the power supply, additional inputs can also be positioned at any location in the plant.

In another embodiment of the invention, large-scale individual conveyor modules, in particular roller conveyors, diverters, curve conveyors or mergers, and/or small-scale individual conveyor modules are provided as individual conveyor modules, in particular a combination of a plurality of individual conveyor modules.

For the distinction between large-scale and small-scale individual conveyor modules, reference is made in full to the description given above.

The object is also achieved by a method for controlling conveyor systems comprising multiple individual conveyor modules, wherein an individual conveyor module comprises at least one conveyor device, at least one actuator for driving the conveyor device, and an integrated control unit, wherein the integrated control unit has a communication unit which carries out the following steps:

exchanging information with a management system that includes the logic of the material flow to be conveyed, providing a first communication level between the individual conveyor modules for configuring the conveyor system with a communication protocol which is not real-time-capable, and providing a second communication level between the individual conveyor modules, which is provided for controlling the respective at least one conveyor device, wherein the second communication level is designed to be real-time capable.

According to the method of the invention, the two communication levels are thus designed, on the one hand, for communication of the integrated control units of the individual conveyor modules with each other and, if necessary, for communication of the integrated control unit of the individual conveyor module with, for example, a central control system or a central warehouse management system. However, this does not include communication to the motor controllers, i.e. to the control units of the actuators for the conveyor devices, such as rollers. According to the invention, this communication level is regarded as a further, third communication level.

This represents a decisive difference from previously known conveyor systems and their control architecture because these known systems comprise a communication interface to the motor controller and a communication interface for communication between the modules, but no second communication level for communication of the modules with one another.

In addition, in the present case, the signals can be exchanged bidirectionally or omnidirectionally via the two communication levels provided according to the invention, which was not possible with the communication levels of previously known conveyor systems because they only provided unidirectional signal transmissions.

Of course, both communication levels can function simultaneously. For example, the real-time interface can be used to operate the plant, while the consistency of the layout can always be checked in parallel via the non-real-time interface. If a module fails, this is detected immediately. The plant can then be brought to a controlled stop without causing a so-called crash, i.e. a collision between objects and the plant.

In a preferred embodiment of the method according to the invention, the communication of the first level consists of a protocol that can communicate without any pre-configuration or addressing and, in particular, can communicate via a mesh topology.

In another preferred embodiment of the invention, the second level communication consists of a protocol that can communicate via a BUS, star, or ring topology, in particular a CAN or CANopen protocol or an Ethernet-based protocol.

Further advantageous configurations are the subject matter of the dependent claims and the detailed description.

BRIEF DESCRIPTION OF THE FIGURES

The invention is explained in more detail below with reference to exemplary embodiments shown in the figures. In the figures.

DETAILED DESCRIPTION

In the following, the invention will be described in more detail with reference to the figure. It should be noted that different aspects are described, each of which can be used individually or in combination, i.e. any aspect can be used with different embodiments of the invention, unless explicitly represented as a pure alternative.

Furthermore, for the sake of simplicity, only one entity will generally be referred to in the following. However, unless explicitly noted, the invention can also have multiple of the entities concerned in each case. In this respect, the use of the word "one", "a" and "an" is to be understood only as an indication that at least one entity is used in a simple embodiment.

Figure 1:
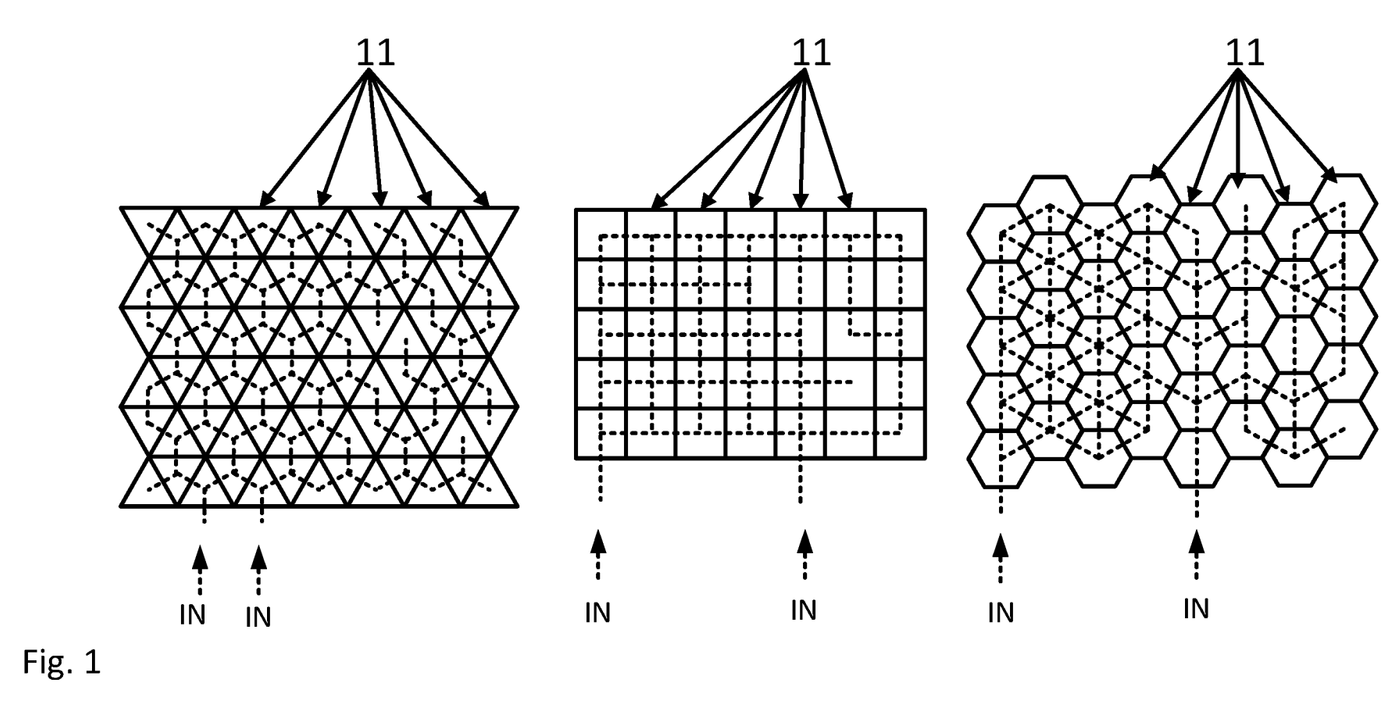
FIG. 1 shows in each case a highly schematized illustration of an arrangement of individual conveyor modules of different geometry with possible communication paths for the first communication level according to an exemplary embodiment of the invention.

In the highly schematized arrangements of individual conveyor modules 11 of different geometry shown in FIG. 1, possible communication paths for the first communication level K1 according to an exemplary embodiment of the invention are shown in each case. The small-scale individual conveyor modules 11 each have an identical geometry, which is triangular, square, or hexagonal and which are connected to form a (partial) conveyor system 10 in such a way that they form a completely closed surface (so-called platonic parquetry). The dashed lines show the topology of the communication of the first communication level K1 of the individual conveyor modules 11 with each other according to the present invention.

The first level K1 consists of a communication protocol that can communicate without any pre-configuration or addressing. However, communication in any topologies (lines, star, ring, tree, mesh, etc.) should be possible. This protocol does not have to be real-time-capable. This can be, for example, serial, Ethernet, etc. On the respective left side of the depicted arrangement of individual conveyor modules 11, the modules are connected to all neighbors. On the respective right side of the illustration, however, the modules are only connected to some neighbors.

Figure 2:
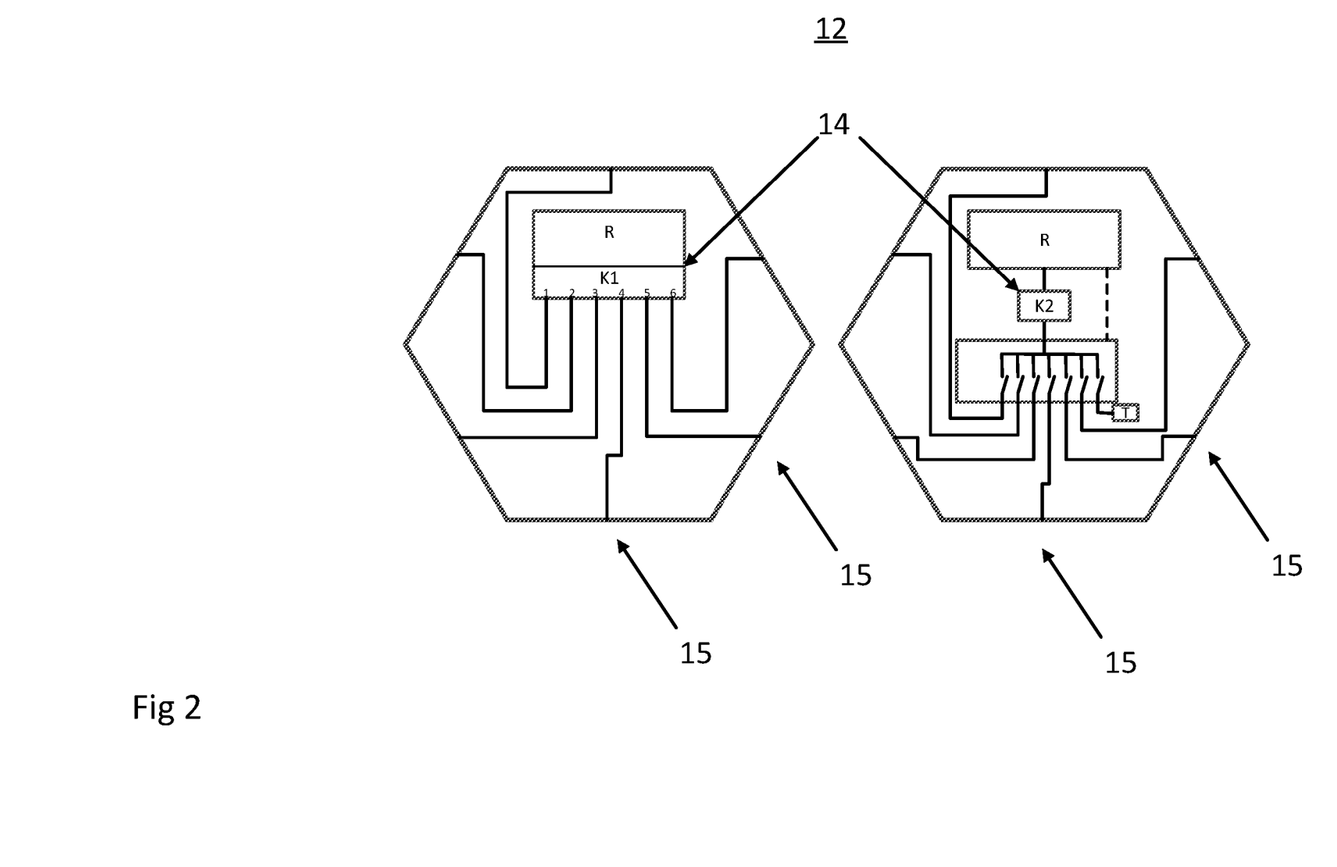
FIG. 2 shows a highly schematized illustration of individual conveyor modules according to a further exemplary embodiment of the invention, FIG. 3 a shows highly schematized illustration of an arrangement of individual conveyor modules of the same geometry with possible communication paths for the second communication level according to an exemplary embodiment of the invention.

FIG. 2 shows a highly schematized illustration of individual conveyor modules 11 according to a further exemplary embodiment of the invention. The hexagonal individual conveyor modules 11 have a plurality of connections 15 for the first communication level, shown in the left illustration, and for the second communication level, shown in the right illustration, and they can communicate with multiple neighboring modules. The connections 15 are connected to the computing unit, which is part of the control unit 12. Thus, the conveyor modules 11 can always exchange information with all neighbors.

The illustrations in FIG. 2 show the arrangement of the communication unit 14 in the control unit 12 of the individual conveyor module 11 with the two communication levels. Denoted are R: computing unit,
K1: first communication level,
1-6: communication ports of the first communication level,
K2: second communication level, and
T: terminal or terminal resistor.

Some BUS systems (e.g. CAN) may require a resistor at the end of the BUS line. Ethernet systems, for example, do not require such a resistor.

The data that pass through the first communication level K1 are processed by the computing unit R and forwarded, if necessary. However, since the computing unit operates in a cyclic or clocked manner, it can only process one message at a time. Thus, the message must be processed before it can be forwarded. This results in a non-deterministic time delay between receipt and forwarding to any neighbor.

Thus, it is preferably to be considered that outdated telegrams do not remain in the system because otherwise the line can quickly become overloaded. Since each connection 15 is connected to the computing unit of the control unit 12 of the individual conveyor module 11, each telegram can be checked here for relevance. In doing so, the message is received and checked by the computing unit. If the information is new, it is processed by the module and, if necessary, forwarded to the remaining connections 15. However, if the information is not relevant, i.e. it is out of date or has already been received, the telegram is deleted. This ensures that only relevant information remains in the system. This type of communication has the advantage that all modules 11 can communicate with each other despite the mesh topology. However, since the computing unit operates in a cyclic or clocked manner, it can only process one message at a time. Thus, the message must be processed before it can be forwarded. This creates a non-deterministic time delay between receipt and forwarding to any neighbor. In the case of many transmissions, the delay can quickly reach unacceptable ranges. Thus, such a non-real-time interface is unsuitable for the communication of the operation of individual conveyor modules 11 with each other within topologies that have numerous nodes.

Nevertheless, the interfaces of the first communication level K1 offer a decisive advantage. With a suitable method in which each conveyor module 11 exchanges its own identification with its neighbors, the topology of the communication network and thus the material flow network can be uniquely mapped. This process is not time-critical since it takes place in particular only once during commissioning of the plant. Thus, for the above reasons, a non-real-time capable communication K1 is suitable according to the invention for the recognition of the topology and for the configuration of a further (second) communication level K2.

For the automatic determination of the layout and thus the topology of the conveyor system, a coordinate system is defined, for example a modified Cartesian coordinate system, with which each individual conveyor module is assigned a unique and one-time coordinate that also serves as a conveyor module identifier. This identifier does not need to be stored in advance in the conveyor module's control unit, so there is no "default address" or pre-configured address. Rather, the identifier is generated during self-configuration. For conveyor systems that form only one line, the coordinate system may be unidimensional. However, since conveyor systems include branches, loops, mergers, crossings, etc., a multi-dimensional coordinate system is preferred. Depending on the properties of the conveyor system, the coordinate system can be changed to another type (e.g., axial, cubic, offset, polar coordinate system). The coordinate system can also be changed after the configuration has been implemented. Thus, the configuration is dynamic.

The layout of the conveyor system and thus the topology are recognized by the communication level K1, and the communication level K2 is configured based on this. The first conveyor module or the central control system is given any coordinate. The conveyor module sends a configuration request (broadcast) to all available communication ports of the first communication level. This request contains, among other things, the module's own coordinate as well as information about the conveyor module type, the geometry of the conveyor module and the port number via which the communication request was sent. If a further conveyor module is connected to one of the ports, this request will be received and processed there. The further conveyor module that has received the request calculates its own coordinate based on the received information and sends it back, via the port where the configuration request was received, to the control unit of the first conveyor module as an acknowledge message together with the information including its own conveyor module type, conveyor module geometry, technical properties of the conveyor module and the port number. In this way, the control unit of the first conveyor module recognizes whether conveyor modules (or control units) are connected and to which communication ports they are connected. After the further control unit of the next conveyor module has sent back the acknowledge message, it forwards the configuration request to the module's free communication port. The process repeats until no more acknowledgements are received (i.e. no more neighboring conveyor modules are present). This means that all control units of the connected conveyor modules have been addressed at least once, have configured themselves and have forwarded the information about, among other things, their own coordinates in the coordinate system, the conveyor module type and the conveyor module geometry as well as other technical properties of the conveyor module to the previous control unit, to the first control unit or, if applicable, to the central control system via a so-called upload routing process. In this way, the layout of the overall system is recognized and the respective control units and thus also the respective individual conveyor modules are clearly identified.

It is well known that BUS systems support multiple topologies (e.g. lines, ring, star, tree, etc.) but do not support mesh topologies. However, conveyor plants, i.e. conveyor systems, can be found in any topologies, in particular mesh topologies. To configure the second communication level, the mesh topology of the plant must be divided into sub-groups or sub-topologies that are supported by a real-time communication system. For this purpose, the layout of the entire conveyor system is analyzed in one of the control units of the first conveyor module or in the central control system, and sub-topologies suitable for real-time communication, by means of which the overall topology of the plant can be mapped, are calculated. This can be, for example, one or more logical BUS topologies or a tree topology which together can build a physical mesh network. This information is used to configure the second communication level K2. Based on the calculated sub-topology, individual commands for the computer units of the individual control units of the conveyor modules for the configuration of the second communication level K2 are generated and sent via the first communication level K1. Since all conveyor modules now have a unique identifier on the first communication level K1, these commands can be sent specifically (non-broadcast) to the conveyor modules concerned. The format of the commands and/or the action contained in the command may differ depending on the interface used. For EtherCAT, for example, this can be a command to switch on/off the EtherCAT ASIC ports. For CAN, it can be a switch of the bus switches. With this method, in most cases, at least one valid uniform topology (i.e. without sub-topologies) can be found, with which the complete system can be mapped. In the remaining cases, several valid topologies are possible or necessary. These sub-topologies can be connected via a detour through the first communication system so that in this case, messages are transferred from one sub-topology to another sub-topology.

The conveyor modules 11 can be connected to all neighbors and thus exchange data, but they do not have to be connected to all neighbors for the first communication level K1. FIG. 1 shows both the topology of the first communication level K1 when all neighbors are connected (left side in each case) and when they are only connected to some neighbors (right side in each case). It should be noted that this first communication level K1 allows multiple inputs and outputs of data. Likewise, the modules 11 can have a single connection 15 without damaging the topology and hindering communication. The different topologies can be used for conveyor modules 11 with any geometry.

The second communication level K2 is a dedicated unit that itself handles the communication once it is configured. During communication via the second communication level K2, the computing unit R is therefore not loaded. Communication via the second communication level K2 is deterministic and real-time-capable. It is therefore very well suited for communication within node-rich topologies. Conventional real-time interfaces support BUS, line, star, and/or ring topologies, etc. Real-time protocols such as CAN, CANopen, Profinet, EtherCAT, etc. are very common. However, they only support BUS or tree topologies, for example, and cannot communicate in mesh topologies, as this represents an invalid topology that can lead to communication errors. However, since the topology of the conveyor system 10 has already been recognized via the first communication level K1, this information can advantageously be used to artificially build a suitable topology for the second communication level K2, so that a standard BUS or Ethernet system can be used.

In a preferred embodiment of the invention, the second communication level K2 consists of a single CAN interface with one or more BUS switches per communication unit. The BUS switch is connected to the computing unit R by means of a suitable interface (for example: i/o, SPI or I2C).

In addition, a terminal resistor T (so-called BUS terminal), which is also connected to the bus switch, is installed in each module 11.

When module 11 is switched on, the CAN interface is disconnected from all switches of the BUS switch. Each module 11 receives a message via the first communication level K1 for the configuration of the second communication level K2. This message contains, among other things, a pair of switches in the BUS switch that are to be closed. The transistors of the BUS switch are switched on and the line topology of the BUS is established. The last module 11 in the BUS receives only one input and its output is connected to a BUS terminal T.

In another preferred embodiment, the second communication level K2 of a control unit consists of a single EtherCAT interface with an EtherCAT ASIC with one or more communication ports per communication unit. The ASIC is connected to the computing unit R by means of a suitable interface (e.g.: i/o, SPI or I2C).

When the module 11 is switched on, the EtherCAT interface is deactivated by deactivating the EtherCAT ASIC. Each module 11 receives a message via the first communication level K1 for the configuration of the second communication level K2. This message contains, among other things, the EtherCAT ASIC communication ports, which should have the status "open" to establish up a suitable topology.

The "line" for the configuration of the BUS can be generated either manually or automatically. Since the topology of the (partial) conveyor system 10 is already known, any search algorithm for an informed search can be used for the automatic generation of the line. Examples for this are A-star, Dijkstra.

Figure 3:
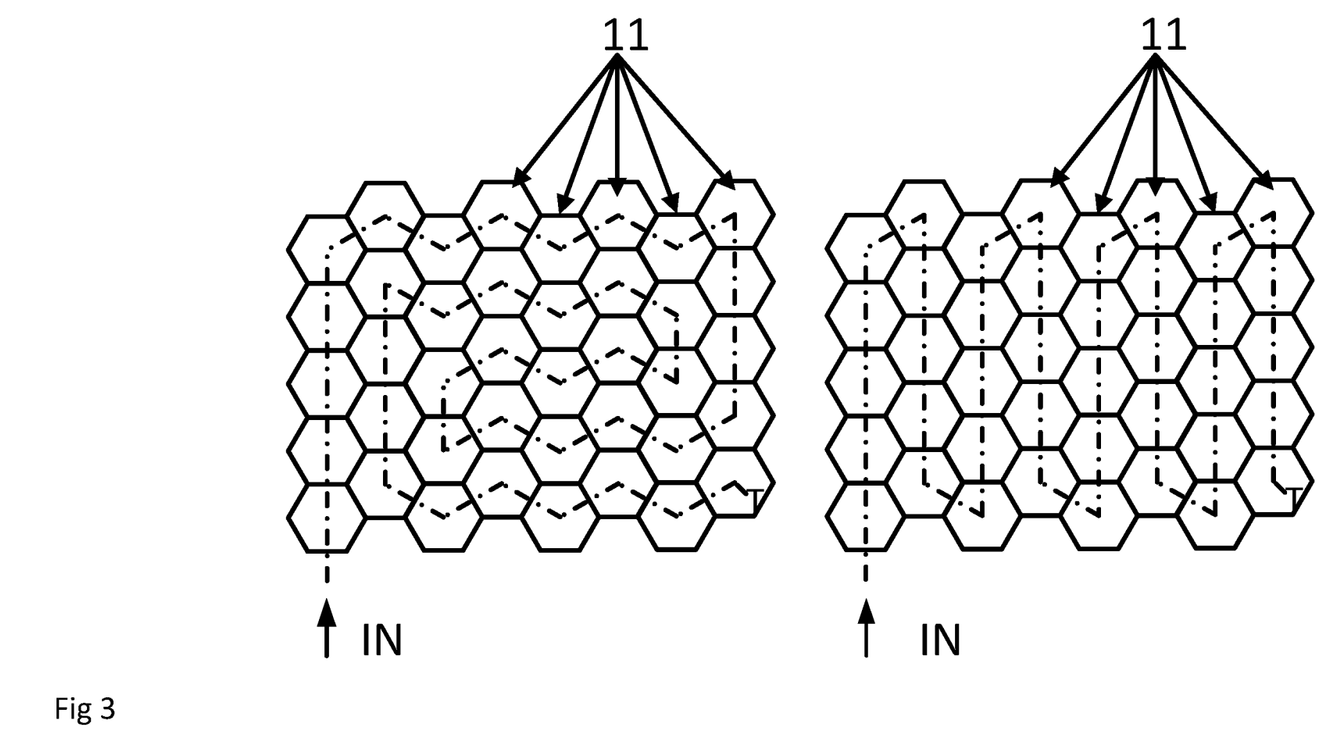

FIG. 3 shows alternative topologies for the BUS line of the second communication level K2 with multiple individual conveyor modules 11. At the end, the "terminal" T is automatically connected with the BUS switch.

Figure 4:
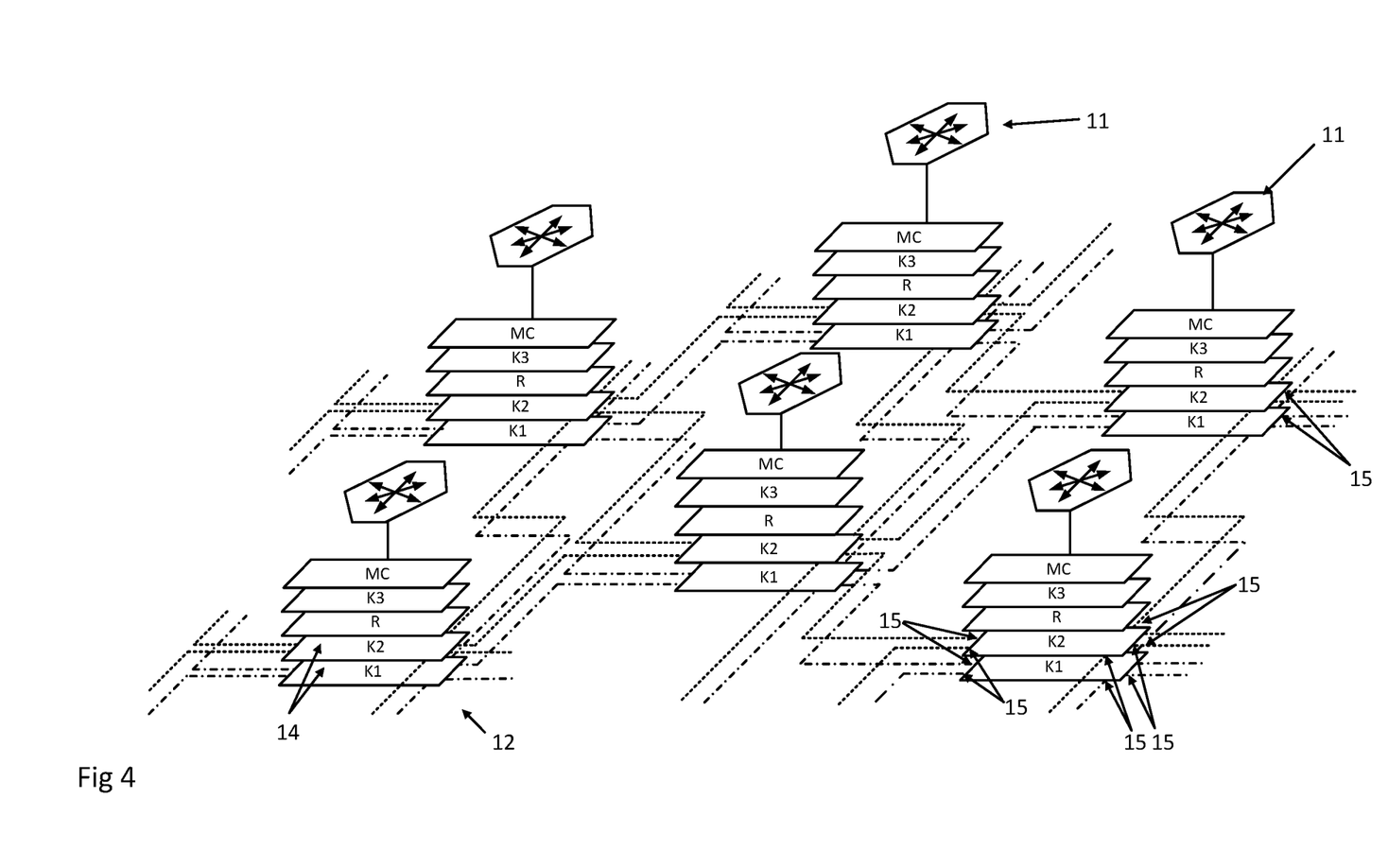
FIG. 4 shows a highly schematized illustration of an exemplary configuration of the present invention.

FIG. 4 shows a highly schematized illustration of an exemplary embodiment of a conveyor system 10 according to the invention with hexagonal individual conveyor modules 11. Each conveyor module 11 comprises a conveyor device 13, which is indicated by directional arrows. As an exemplary embodiment for an actuator for driving the conveyor device, the conveyor device 13 is driven by a motor, which is not shown. The motor is controlled by a motor controller MC. Such a motor controller is an example of an output unit for controlling the actuator. The motor controller MC receives data from the control unit 12 via a communication interface K3. The interface K3 for communication of the control unit 12 with the motor controller MC can be a standard interface, for example an Ethernet, fieldbus, USB, serial, i2C interface, etc., or a classical I/O interface.

It is emphasized that this interface K3 does not belong to the two, in particular different, logical communication levels for the communication of the individual conveyor modules with each other, which are marked here in the diagram as K1 and K2. This is because interface K3 is not and cannot be used for communication of the individual conveyor modules 11 with one another.

This represents a decisive difference to the previously known conveyor systems and their control architecture because these known systems comprise a communication interface K3 to the motor controller and a communication interface for communication between the modules, but no second communication level for the communication of the modules with one another.

The communication interface K3 is supplied with the appropriate control data for the motor controller by the computing unit R. According to the invention, two, in particular two different communication levels K1 and K2 are connected to the computing unit R, each of which provides for communication between the individual conveyor modules. In this case, a non-real-time protocol can be provided for a first communication level K1. This first communication level K1 is primarily used for recognizing and configuring the topology of the conveyor system 10.

The second communication level K2 is designed as described above for FIG. 2.

The arrangement according to the invention and the method that can be carried out therewith do not only work with small-scale conveyor modules but also with large-scale conveyor modules, in each case with any geometry, function and number of connections. They also work with a combination of large- and small-scale conveyor modules. Thus, any complex topology can be recognized and real-time communication between modules is made possible.

The arrangement according to the invention makes it possible to variably control large conveyor systems with many individual conveyor modules as well as small conveyor systems with few individual conveyor modules in such a manner that partial decentralized control is made possible. Due to the two parallel communication levels for the communication of the individual conveyor modules with one another, it is possible for the first time that latencies are completely avoided. In addition, improved variability in case of changes is provided in order to be able to carry out changes more quickly and also to reduce the planning and installation time, in particular of large conveyor systems with many individual conveyor modules, and to simplify the process overall.

Figure 5:
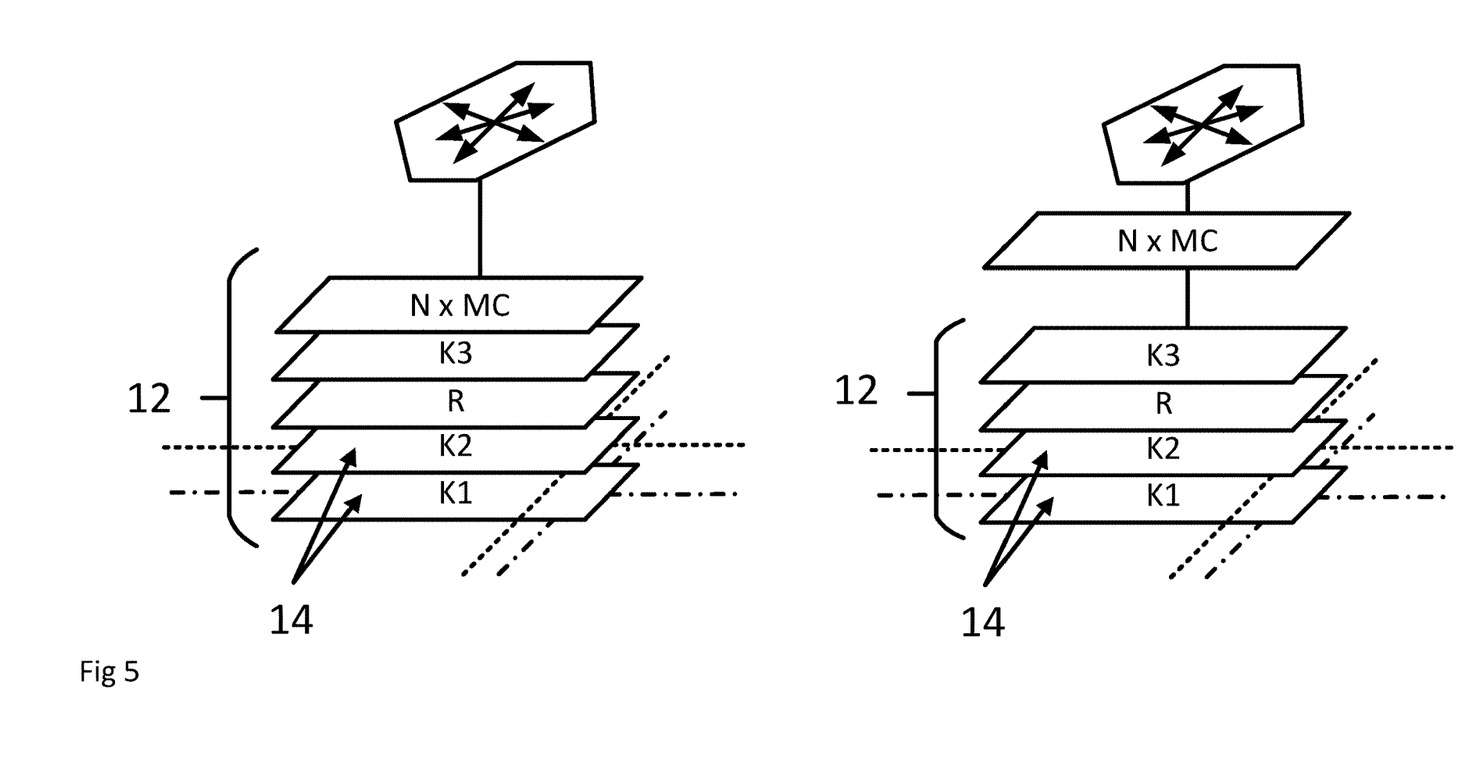
FIG. 5 shows an enlarged detailed illustration of two individual conveyor modules according to FIG. 4.

FIG. 5 shows individual conveyor modules 11 of a conveyor system 10 according to the invention in two different variants. As in FIG. 4, the individual conveyor modules include the components of at least one conveyor device, which is indicated with directional arrows, and a control unit 12. The image on the left shows, in addition to the two communication levels K1 and K2, which are defined as described above and are designated by 14, and the computing unit R, a variant in which the motor controller(s) MC for controlling the conveyor device(s) is/are also integrated into the control unit 12. In contrast, the image on the right shows a variant in which the control unit 12 does not contain the motor controller(s) MC for controlling the conveyor device(s); however, they are provided separately in the individual conveyor module.

Figure 6:
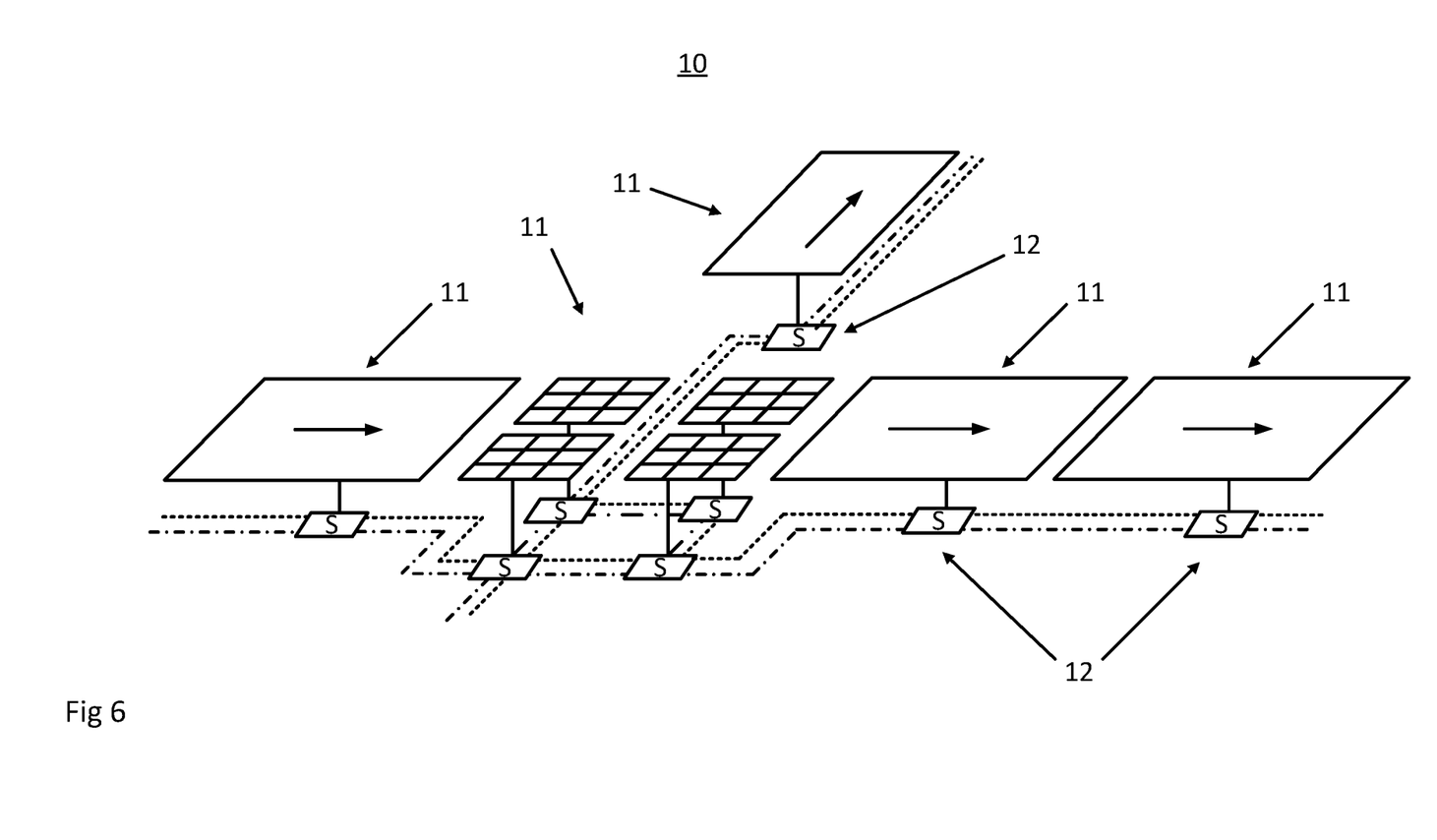
FIG. 6 shows a highly schematized illustration of a conveyor system according to the present invention according to another exemplary configuration, and FIG. 7 a shows highly schematized illustration of a conveyor system according to the invention according to another exemplary configuration.

FIG. 6 shows a highly schematized illustration of a further exemplary embodiment of a conveyor system according to the invention with large-scale and small-scale individual conveyor modules 11. In the embodiment shown here, the small-scale individual conveyor modules 11 are combined into clusters.

Figure 7:
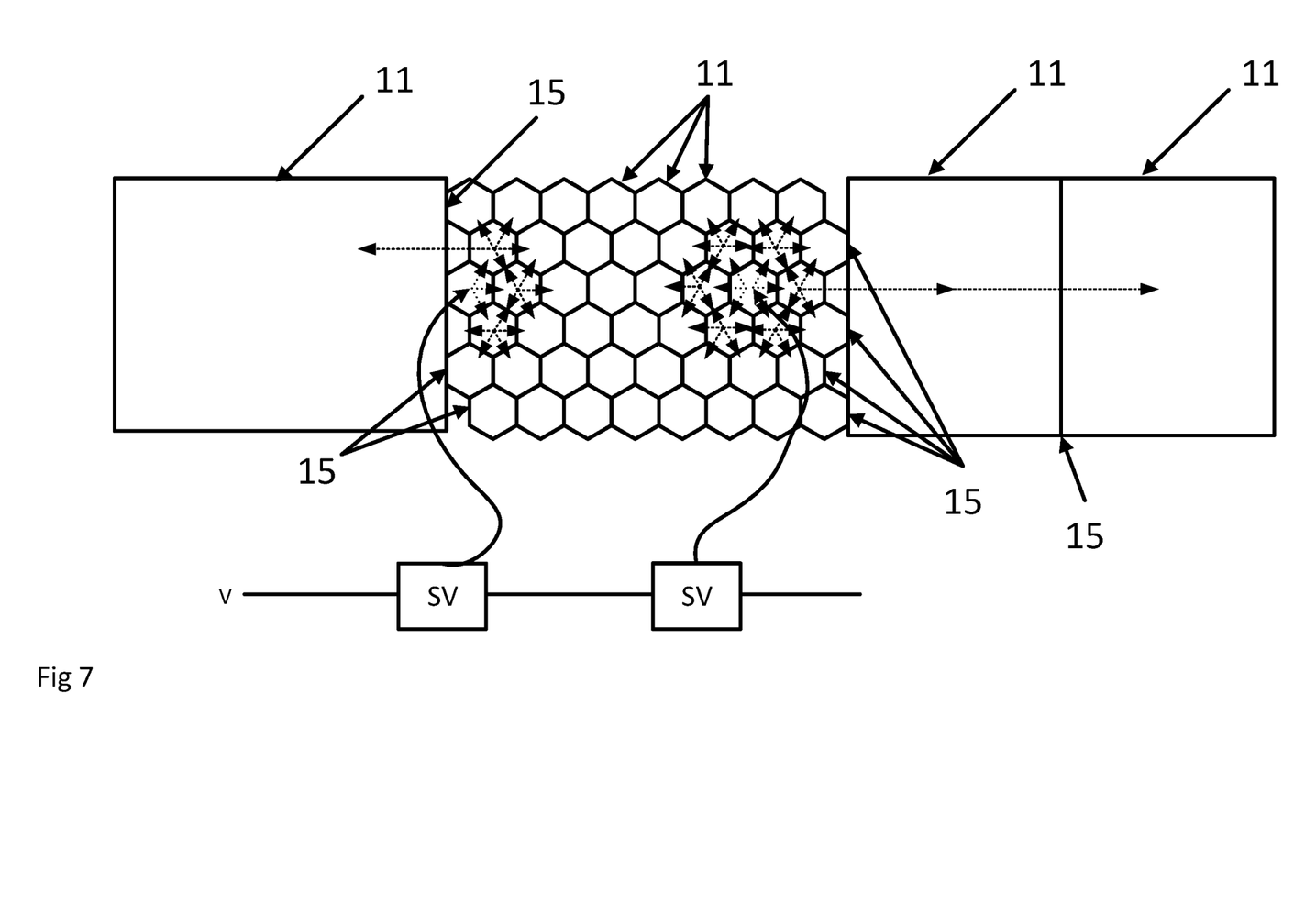

In FIG. 7, a highly schematized illustration of a further variant of a conveyor system 10 according to the invention is shown. Large-scale individual conveyor modules 11 as well as small-scale individual conveyor modules 11 arranged together to form a uniform conveying surface are components of the conveyor system 10. The transmission points and connections of the power supply are indicated by directional arrows. In particular, connections 15 are provided at the transition points between the individual conveyor modules to establish a communication link in two levels, as shown above in FIGS. 2, 4, 5 and 6. In addition, an external power supply SV is provided which supplies power to the individual modules 11 in an at least partially decentralized manner. Such a power supply SV also includes that a power supply unit or converter is not used for each individual conveyor module, but that it is also possible to loop the power supply from one individual conveyor module 11 to the next individual conveyor module 11 with a simple cable connection or a plug connection. Thus, FIG. 7 also shows an exemplary distribution of the current in the system.

Preferably, a single connector 15 can be used for the connection between the individual conveyor modules 11. The connector 15 comprises multiple pins that conduct both power and data for communication.

With a single connector, connecting the individual conveyor modules 11 to the conveyor system 10 is easier than with conventional systems. Previously known conveyor systems provide at least two connectors, wherein one connector is used for power supply and a separate connector is used for communications.

As a result, a considerable amount of time and effort in wiring the individual conveyor modules can therefore be saved according to the invention.

What is claimed is:

1. A modular conveyor system comprising:
   multiple individual conveyor modules, wherein each individual conveyor module comprises:
      at least one conveyor device;
      at least one power supply;
      at least one actuator for driving the conveyor device;
      an output unit for controlling the at least one actuator; and
      an integrated control unit,
   wherein the integrated control unit comprises a computing unit for processing information, and a communication unit, and wherein the communication unit is configured to carry out communication in such a way that communication of the individual conveyor modules with one another is implemented in two logical communication levels, wherein the two logical communication levels are implemented by two separate and independent communication interfaces, wherein a first communication level of the two logical communication levels is used for layout recognition and configuration of the conveyor system,
   wherein the first communication level is used to perform a self-configuration process where each conveyor module determines its own conveyor module identifier based on information received from a neighboring conveyor module, and
   wherein a second communication level of the two logical communication levels is provided for controlling the conveyor modules based on the conveyor module identifiers.

2. The conveyor system according to claim 1, wherein a topology of a material flow in the conveyor system is identical to a topology of a communication network formed by the communication units of the individual conveyor modules.

3. The conveyor system according to claim 1, wherein the first communication level of the two logical communication levels comprises a communication protocol which is not real-time-capable.

4. The conveyor system according to claim 1, wherein the second communication level is real-time-capable.

5. The conveyor system according to claim 1, wherein both of the two logical communication levels are configured to be operated in parallel during operation of the conveyor system.

6. The conveyor system according to claim 3, wherein a mesh-capable interface, a serial interface, or an Ethernet interface is provided as an interface for the first communication level.

7. The conveyor system according to claim 4, wherein a BUS interface, an Ethernet-based interface, or a line, star and/or ring topology is provided as an interface for the second communication level.

8. The conveyor system according to claim 1, wherein the communication unit of an individual conveyor module comprises a plurality of connections, and wherein a number of the connections corresponds to a number of neighboring individual conveyor modules with which the individual conveyor module communicates.

9. The conveyor system according to claim 1, wherein the communication unit of each individual conveyor module comprises a plurality of connections, and wherein a number of the connections corresponds to a largest possible number of neighboring individual conveyor modules.

10. The conveyor system according to claim 1, wherein further sensors or actuators are connected to an individual conveyor module via a non-real-time-capable interface.

11. The conveyor system according to claim 1, wherein supply of power from an individual conveyor module to adjacent individual conveyor modules takes place with cables.

12. The conveyor system according to claim 1, wherein the individual conveyor modules correspond to roller conveyors, diverters, curve conveyors, or mergers.

13. A method for controlling a conveyor system comprising a plurality of individual conveyor modules, wherein an individual conveyor module comprises at least one conveyor device, at least one actuator for driving the at least one conveyor device, and an integrated control unit, the method, comprising:
   exchanging information with a management system that includes logic of a material flow to be conveyed;
   providing a first communication level between the individual conveyor modules for configuring the conveyor system with a communication protocol which is not real-time-capable;
   performing, using the first communication level, a self-configuration process where each conveyor module determines its own conveyor module identifier based on information received from a neighboring conveyor module;
   providing a second communication level between the individual conveyor modules, which is provided for controlling the at least one conveyor device, wherein the second communication level is real-time capable, wherein the first communication level is used for recognizing a topology of the conveyor system, and wherein the second communication level is configured based on the topology of the conveyor system as recognized by the first communication level; and
   controlling, using the second communication level, the individual conveyor modules based on the conveyor module identifiers.

14. The method according to claim 13, wherein the first communication level comprises a protocol that communicates via a mesh topology.

15. The method according to claim 13, wherein the second communication level comprises a protocol that communicates via a BUS, line, star, or ring topology.

16. The conveyor system according to claim 1, wherein the self-configuration process further comprises:

a first conveyor module sending a configuration request through a port of the first conveyor module to a second conveyor module, the configuration request including a conveyor module identifier of the first conveyor module; and the second conveyor module determining a conveyor module identifier of the second conveyor module based on the conveyor module identifier of the first conveyor module, and sending an acknowledgement through the port to the first conveyor module that includes the conveyor module identifier of the second conveyor module.

17. The conveyor system according to claim 1, wherein each conveyor module identifier indicates a location of a corresponding conveyor module within a coordinate system.

* * * * *